US012698951B2

(12) United States Patent

Vu et al.

(10) Patent No.: US 12,698,951 B2

(45) Date of Patent: Aug. 4, 2026

(54) METHOD FOR DETERMINING POSITION OF A LASER POINT APPLIED IN A FIREARM TRAINING SIMULATION SYSTEM USING INFRARED LASERS

(71) Applicant: VIETTEL GROUP, Ha Noi City (VN)

(72) Inventors: Anh Tuan Vu, Ha Noi City (VN); Duc Thanh Nguyen, Ha Noi City (VN); Van Duc Ha, Thanh Hoa City (VN); Kim Duc Hoang, Cam Lo District (VN); Thanh Nhon Nguyen, Ha Noi City (VN); Anh Tra Duong, Ha Noi City (VN); Tran Nam Nguyen, Hanoi City (VN)

(73) Assignee: VIETTEL GROUP, Ha Noi City (VN)

( * ) Notice: Subject to any disclaimer, the term of this patent is extended or adjusted under 35 U.S.C. 154(b) by 321 days.

(21) Appl. No.: 18/358,234

(22) Filed: Jul. 25, 2023

(65) Prior Publication Data

US 2024/0068783 A1 Feb. 29, 2024

(30) Foreign Application Priority Data

Aug. 31, 2022 (VN) ................................ 1-2022-05576

(51) Int. Cl.
*F41G 3/26* (2006.01)
*G06V 20/40* (2022.01)
*G06V 20/80* (2022.01)

(52) U.S. Cl.
CPC ........... *F41G 3/2655* (2013.01); *G06V 20/44* (2022.01); *G06V 20/80* (2022.01); *G06V 2201/07* (2022.01)

(58) Field of Classification Search
CPC ...... F41G 3/2655; G06V 20/80; G06V 20/44; G06V 2201/07
See application file for complete search history.

*Primary Examiner* — Robert P Bullington, Esq.

(74) *Attorney, Agent, or Firm* — patenttm.us

(57) ABSTRACT

A method to detect, identify and determine the position of laser points from infrared laser emitters in a firearm training simulation system. The method consists of two steps. This first step combines some common tools such as a camera with a filter switcher and edge and corner detecting algorithms in image processing to provide a fast automatic screen calibrating method. The second step is to detect laser point objects in each frame continuously captured by the camera, and then further process these objects to identify laser shots, filter out noisy objects, and eventually detect simulated shots from different laser emitters and determine the final mapped position of the shot.

6 Claims, 3 Drawing Sheets

METHOD FOR DETERMINING POSITION OF A LASER POINT APPLIED IN A FIREARM TRAINING SIMULATION SYSTEM USING INFRARED LASERS

FIELD OF THE INVENTION

This invention is related to weapon simulators, in particular the laser emitter and method to detect laser shots by camera within a firearm training simulation system.

BACKGROUND OF THE INVENTION

In a firearm training simulation system, it is common to mount an infrared laser emitter on a simulated firearm or a real firearm to generate laser shots. To further reduce interference, the laser emitter generally operates at a specific wavelength, typically at 850 nm. The receiver could be a target attached with infrared sensors to detect the laser signal directly, or a system comprising a camera, a projector and a projection screen that captures the reflected laser signal. Within a system that uses camera to detect laser shots onto virtual targets, the camera must be equipped with a narrow band-pass filter corresponding to the chosen wavelength. This camera-based system requires a screen calibration step, more precisely, a screen mapping step, in which the camera detects the alignment, corners and edges of the projected image on the screen either automatically or via manual input. During this step, the infrared filter is often manually removed so that the camera can capture the screen with visible light, and then the filter is reattached after the mapping process is done. In cases where the filter is fixed and cannot be detached, the process requires marking techniques with extra infrared illuminations. This can be a tedious process if it has to be done regularly, for example if the system is required to be mobile, or if there are ground vibrations that affects the system configuration, e.g. due to nearby construction.

Furthermore, the laser emitter is required to shoot a laser beam right after the hammer strikes the firing pin when a user pulls the trigger, ensuring minimal delay. In some systems, wired electro-mechanical trigger mechanisms are placed at the trigger, the hammer, or the edge of the slider. This is a highly reliable detection method but the wiring can be tricky and negatively affect firearms handling. Other systems use shock sensors to detect the firing moment, which eliminates the wiring problem but introduce sensitivity to vibrating noise. For example, the slider can cause other vibrations when it moves during an actual shot if the firearm is equipped with a recoil simulator, leading to multiple laser beams per one trigger pull, and thus adding multiple false detections.

Another issue is that there can be multiple firearms shooting at the same time onto the screen. In such cases, there must also be a method to distinguish between individual shots from different weapons. To solve this detection and synchronization problem, wireless connections such as WIFI, Bluetooth or RF are common choices. However, there are complications with wiring and firearm handling when integrating these technologies onto real firearms, because the laser emitting devices need more space for antennas to function properly.

SUMMARY

The present invention provides a method to solve the aforemention problems for a system comprising a camera connected to a computing device to capture and identify laser shots, a projector, and real firearms equipped with laser emitters and recoil kits. This method has mainly 2 steps: screen mapping and laser shot detection. The first step includes the combination of said camera, attached with a filter switching mechanism, and image processing methods programmed in said computing device to quickly handle the screen mapping process. The second step introduces a technique to detect and distinguish laser shots without using common wireless data communication technology between the laser emitters and the other devices within the system. This technique utilizes the temporal characteristics of shock signals, and the spatial signatures of the images of the reflected laser beams to identify laser shots.

SPECIFIC DESCRIPTION

Figure 1:
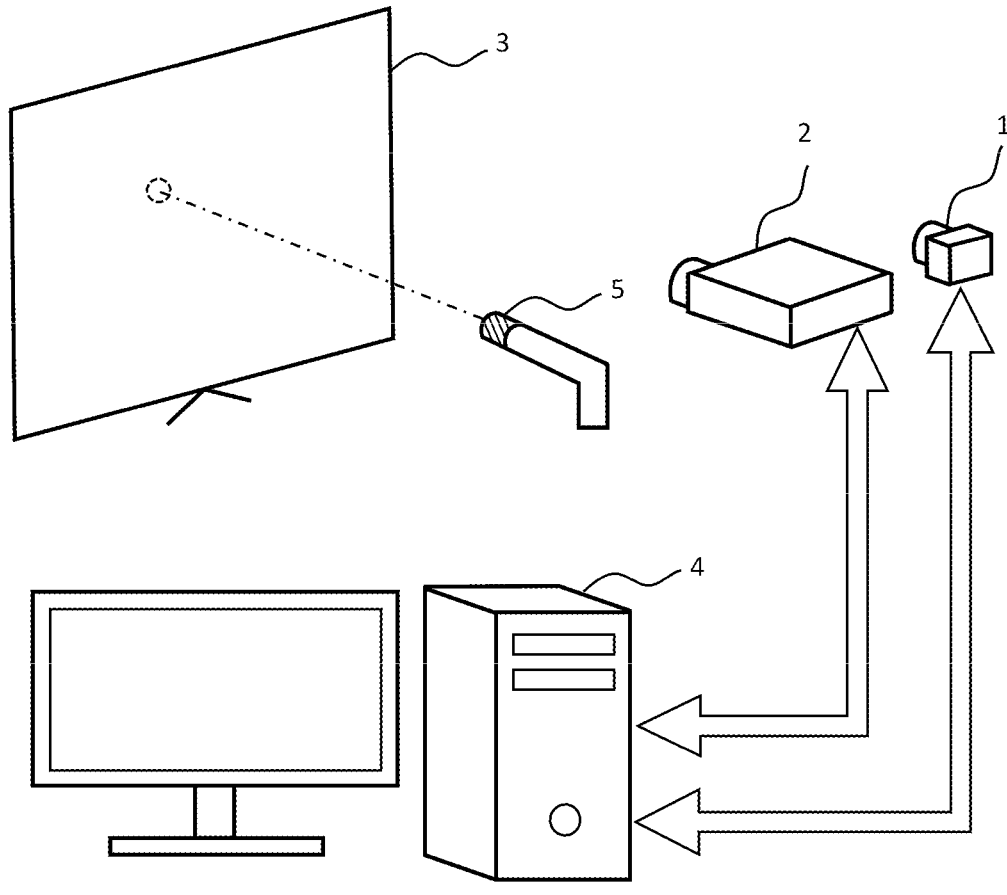
FIG. 1 is a diagram of an exemplary embodiment of the firearm training simulation system that applies this present invention.

The firearm training simulation system that applies the method in this present invention consists of a real firearm equipped with a laser emitter and a recoil simulator, a high-speed camera equipped with an infrared filter switching mechanism, a projector, a reflective screen and a computing device operatively connected to the camera and projector, as shown in FIG. 1.

The high-speed camera 1 captures infrared images of the screen and its surrounding area at a frame rate of at least 120 frame per second at default resolution. This camera features a filter switching mechanism to place either an infrared filter that matches the wavelength of the laser emitter, typically 850 nm, or a regular visible light filter in the front of the camera. The mechanism can be software-controlled from the computing device. The infrared image data obtained from the camera, when the infrared filter is placed, is a single-layer matrix, or also referred to as a single-channel matrix, with the maximum numbers of rows and columns corresponding to the resolution of the camera. The data value of each element in the matrix is represented as a gray value or gray intensity, and the commonly used 8-bit image format has a gray intensity scale from 0 to 255. An image frame, or simply a frame, is not only the bounded area of an image, but also the data format that is streamed by the camera 1 to the computing device 4 and can contain the mentioned matrix and also other related data such as frame number, image size, and mode of operations. The camera can continuously stream both compressed and uncompressed image data.

The projector 2, connected to the computing device, projects high resolution images onto the screen 3. The screen 3 is used to show the virtual targets for training, and also to ensure a adequate reflected intensity of laser shots. The projector is configured so that the projected image fits inside the screen and thus the camera 1 can capture the whole area containing this projected image. The image corners and edges mentioned herein refer to the four corners and four edges of this projected image captured inside the images streamed by the camera 1. The camera 1 and projector 2 are directly connected to the computing device 4. The computing device 4 is configured to control the camera, and to receive and process data from the camera with a piece of software referred to as the laser detection program. The computing device can also generate images of virtual targets from the main simulation program to the projector. Aside from these two programs, the computing device is also configured to execute multiple other programs within the training system software such as an instructor program with a user interface so that the user can create and select training scenarios.

Infrared laser emitter 5, has a wavelength corresponding to the infrared filter on the camera, which can be reprogrammed to vary the time period for a single laser shot or spread it into a pattern, e.g. 5 ms continuous emission, then 5 ms off, then 10 ms emission again. This laser emitter is mounted on the barrel in the front of a real firearm. Whenever the laser emitter receives a shock signal large enough right after the trigger is pulled and the hammer strikes the firing pin. The firearm can be equipped with a recoil simulator, or also often referred to as a recoil kit, either hydraulic or electromagnetic, to simulate recoil force, and because of this recoil simulator the slider can also create shocks that can activate the laser emitter. Based on the analysis of different shock signal types, which depend on the firearm and recoil simulator mechanisms, each laser emitter is then programmed to produce a slightly different emission pattern. An identification number can then be assigned to each laser emitter. The computing device is configured to read a data of laser emitter identification configurations stored in the form of a table, hereinafter referred to as the ID table, including but not limited to the laser shot durations of the patterns, detection proximity, the type of assigned weapon and the identification number. The laser emitter only receives shock signal inputs, and in return send laser beams as outputs, without any other form of data communication to the computing device or other devices within this system.

Details of the design and manufacture of any of these devices, including the workstation, the camera, the laser emitter, the firearm or the recoil kit are not within the scope of this invention. In other words, the present invention works with any of kind of cameras or laser emitters that have these aforementioned specifics. To sum up, the device compatibility requirements must include but not limited to the following: the camera has a filter switching mechanism that can be software-controlled from the computing device; the camera has a band pass filter that matches the laser emitter wavelength; the laser emitter uses shock sensors and is reprogrammable or reconfigurable to customize the emitting beam pattern based on the characteristics of the shocks caused by the firearm equipped with the recoil kit; the computing device is capable of receiving and processing the data stream from the camera, controlling the camera, generating images to the projector, and executing the laser detection program.

Several similar technical terms used within this present invention related to the firearm and the laser emitter are defined as follows:

A simulated shot is defined as a complete process starting from when a user pulls the trigger, then the hammer on the firearm strikes the firing pin, then the slider on the gun moves back towards the shooter by means of a recoil simulator, and then the slider moves back to the initial position, and the process ends when the entire firearm returns to the initial state as it was before pulling the trigger. Each simulated shot is supposed to simulate the operational cycle of a real firearm shot, and the system will have to distinguish each of these simulated shots to correctly generate a virtual shot towards virtual targets. The term "position of laser shot" or "position of laser point" in this present method refers to the final estimated position of the contacting point of the laser on the screen at the start of the simulated shot immediately after the trigger is pulled, or in other words the position of the first laser shot in a simulated shot. This position is correlated to the aiming point of the shooter and it is the main output sent from the laser detection program to the main simulation program, so it has to be determined when the simulated shot is identified.

A laser shot is defined as a short time period, typically no longer than 100 ms, in which the laser emitter projects a continuous beam onto the screen. The laser shot is activated whenever the shock sensor in the laser emitter receives high magnitude vibrations as shock signals. A simulated shot typically comprises several laser shots, either due to multiple shock signals during the whole simulated shot, or because the laser emitter is programmed to send multiple laser shots in a pattern instead of one single beam over time. The shortest shot, whether in a pattern or not, must span at least 2 consecutive frames based on the capture frequency of the camera. When a laser emitter beams continuously instead of waiting for activation from shock signals and is detected by the laser detection program, it is referred to as an endless laser beam.

A laser object, also referred to as a laser point, a laser point object, or simply an object, is defined as a set of neighboring pixels on an image within a single frame captured by the camera, wherein each pixel intensity is above a determined threshold. This object is detected by the laser detection program using image processing algorithms within each frame. During each aforementioned laser shot, the camera can capture multiple consecutive frames, and each one of these frames contains at least one laser object corresponding to the ongoing laser shot. The shape of each laser object may sometimes not be round but may appear as an elongated region or blob. The elongated direction results from the movement of the firearm during the laser shot, with the orientation corresponding to this motion. The position of an object hereinafter is the position of the center point of that object in the camera captured image, with horizontal coordinate x and vertical coordinate y.

Provided herein are embodiments of the present invention. The present method includes two principal steps: an automatic screen alignment calibration step, hereinafter referred to as the screen mapping step, and a laser shot detection step. Although these steps are described together as a sequential process, they also function as different modes of operations. The screen mapping step must be successfully completed at least once prior to the operation of the laser shot detection step.

The screen mapping step is executed through the substeps described below. This step provides a fast automatic screen mapping method that takes seconds by utilizing common tools such as the aforementioned camera, and image processing techniques.

Substep 1a: The system is powered on including the camera, the computing device, and the projector, starting the mapping process. The computing device is configured to control the camera to switch to the regular visible light filter.

Substep 1b: The computing device generates a series of monotone calibration images and projects them onto the screen. The images may include but not limited to the following: horizontal black-and-white stripes, vertical black-and-white stripes, checkerboard pattern, or randomized patterns with corner markers. Typically at most three images are substantial for the mapping calculation. The computing device is programmed to control the camera to capture each image once and the program stores these images separately.

Substep 1c: The captured images are processed using standard image processing algorithms to determine image boundaries including corners, edges and bounded area in which the projected image on the projection screen spans. In the event of detection failure, typically due to high intensity ambient light, the software will automatically attempt to start again from substep 1b while adjusting brightness and contrast of the captured image. In the event of failure of at most 3 repeated attempts, the images are exported and then an error message is generated. In this case, the user should attempt to reduce excessive light and manually change brightness configuration of the laser detection program before restarting the process. If the boundary detection process succeeds, the computing device programmatically advances to substep 1d.

Substep 1d: For purposes of clarification, in the present system three derivative images are generated from a single original image: the original calibration image, which is generated and stored on the computing device; the projection image, which is generated and displayed via the projector onto the screen; and the captured image, which is acquired by the camera. Based on the information calculated in substep 1c, together with the specifications of the camera and the known patterns from the generated calibration images, the computing device calculates and generates a mapping correlating any point from within the aforementioned bounded area of the projected image in the camera captured image to the corresponding point in the original calibration images. The mapping can be in a form of a transformation matrix or a set of coefficients for second-degree functions, depending on the images used and the distortion of the images:

$$P(x_{original}, y_{original}) = M \times P(x_{camera}, y_{camera})$$

Substep 1e: The computing device stores the mapping and the boundary parameters. Completion of this substep ends the screen mapping step.

Figure 2:
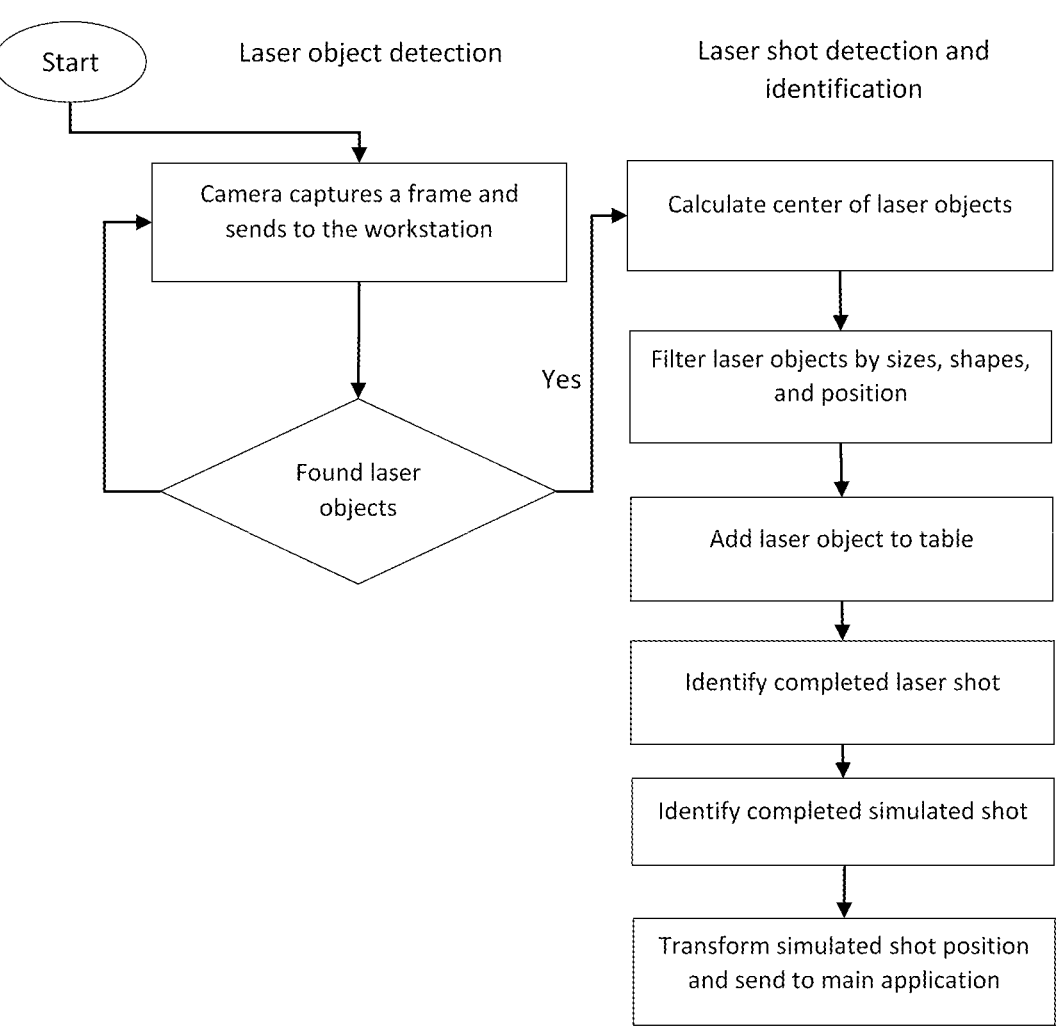
FIG. 2 is a flow chart of the method of detecting laser shots and simulated shots.

The second step of the method involves detection of laser objects in each captured frame, processing of these objects to identify laser shots, filtering out noisy artifacts, and eventually identification of simulated shots from different laser emitters and determination of the position of the shot on the original image. For purposes of clarification, the original image mentioned in this step is an image of the training environment with virtual targets generated by the main simulation program and projected onto the screen. The substeps for this part is explained below and illustrated in FIG. 2.

Substep 2a: At the start of this step, the computing device is configured to control the camera to switch to the infrared band pass filter. The laser detection program also reads the aforementioned ID table that is a data table of pattern configurations for all laser emitters in use. More detail descriptions related to the pattern configurations are presented in substep 2g and 2h.

Substep 2b: The camera continuously captures and streams real-time image data to the computing device.

Substep 2c: The laser detection program process each captured frame to detect clusters of bright pixels that can be labeled as potential laser objects and filter out noise artifacts based on object size. In order to provide ongoing object detection, substep 2b and substep 2c operate in a continuous loop.

From substep 2d onward, although these are presented as substeps, the workstation only process further in the event when at least one potential laser object is found, and these substeps in fact execute as a separated sequence for laser shot detection and identification, running in parallel to the ongoing object detection loop of substep 2b and substep 2c. Typically, the object detection loop and the laser shot detection sequence are executed in different threads on the computing device. In alternative embodiments, if the camera has image processing capabilities then substeps 2b to 2e can perform partially or solely on the camera.

Substep 2d: The laser detection program calculates the center point for each laser object within one capture frame using a center-of-mass type equation:

$$P_{x-camera} = \frac{\sum V_i \times x_i}{\sum V_i}$$

$$P_{y-camera} = \frac{\sum V_i \times y_i}{\sum V_i}$$

Where $V_i$ is the gray value of pixel i within a potential laser object. This value must exceed a predetermined intensity threshold to be considered.

Substep 2e: The laser detection program further filters out false laser objects based on shape, size and position. For example if the center position of an object is outside the found bounded area determined in the screen mapping step, the object is ignored even if it is actually from a laser shot.

Figure 3:
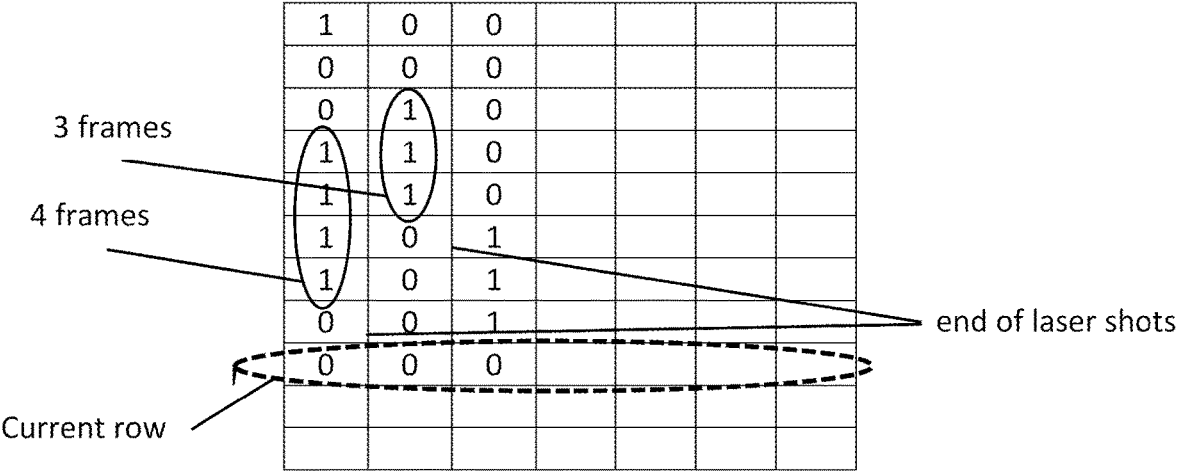
FIG. 3 is a sample table of laser objects in consecutive frames.

Substep 2f: The laser detection program adds these potential laser objects into a table according to the following rules:

The columns correspond to detected laser shots, each of which may contain multiple objects, while the rows correspond to consecutive frames. The number of columns and rows should be large enough to contain the maximum expected number of laser objects. For example: if up to 6 firearms may fire consecutively, there at least 6 columns are required; if each laser shot spans about 8 frames, there at least 10 rows are required. Initially, add "0" to all column in each row if no object is found in the corresponding frame. FIG. 3 illustrates a sample laser object table.

While processing a new frame, if the position of a new object is not proximate to a detected object in the previous frame, add a "1" to an empty column with all "0" or a new column. If the position of a new object is proximate to a detected object in the previous frame, a "1" is added in the same column with the older object. If no new object is proximate to a detected object in the previous frame, add a "0" to the same column under this older object. The appropriate definition of the proximity is determined by experiments with the laser emitter for each type of firearms.

When reaching the last row due to the limit size of the table, shift all rows up one row by deleting the top, oldest row and append a new row with all "0" at the bottom.

Substep 2g: The laser detection program detects laser shots after each frame according to the following rules:

Each laser shot spans a predefined number of frames. For example a 10 ms shot can span 3 to 4 frames at 240 fps. At the start of a new frame corresponding to a new empty row, check the previous rows column by column. If there is a series of multiple consecutive "1" in a column and there is a "0" in the row right after the last "1" in the same column, then this series corresponds to a laser shot and the "0" indicates that the shot has ended. If the number of consecutive "1", starting from the bottom counting backward, correspond to a valid laser shot duration according to the ID table, this is confirmed as a laser shot from a configured laser emitter. If this series of "1" is shorter than any laser shot durations in the ID table, the current column of "1" is discarded as a false shot. If this series of "1" is longer than all laser shot durations in the ID table, there can be multiple laser shots in close proximity, but they will be counted as one laser shot only. If the number of "1" exceeds an upper threshold, the laser shot is classified as an endless laser beam instead. In general, endless laser beams are not used together with laser shots. More detail on the usage of endless laser beams are presented in the next substep.

The position of the detected laser shot is the position of the object in the first frame of the series, equivalent to the first row that contains a "1" of the series in this column.

Figure 4:
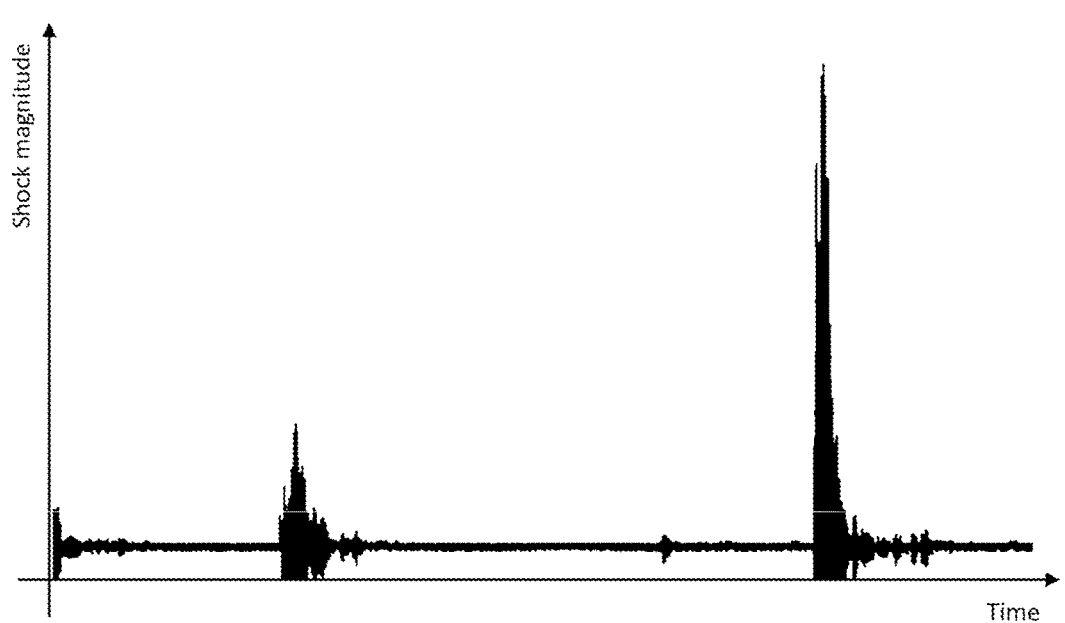
FIG. 4 is a sample magnitude-time graph of shock signals received on the shock sensor of the laser emitter

Substep 2h: The laser detection program identifies simulated shots as follows:

As mentioned above, a simulated shot typically consists of multiple laser shots. A sample of the shock signal on a handgun is shown in FIG. 4. The laser emitter in this case projects three laser shots corresponding to three detected shock signal peaks, each above a predefined threshold magnitude. The first peak corresponds to vibrations caused by the hammer striking the firing pin. The time period between these peaks falls within a limited range, and the position of the laser shots from the same simulated shot falls within a limited dispersion region on the captured image. This forms a kind of spatiotemporal pattern corresponding to the characteristics of each type of firearms, and also unique to each firing mode on the same firearm, such as semi-automatic, burst or full-automatic. Simulated shots from different laser emitters equipped on different firearms can then be identified. Laser shots that do not conform to a known pattern are discarded as noisy response of the laser emitter to other types of shock signals not related to an actual simulated shot, for example strong shock signals may appear when the user attaches the magazine. Each pattern can be determined experimentally using the camera captured images, which can extract the timing, positions and moving directions of the laser objects. Then the laser emitters are configured to project laser shots with substantial and different durations to ensure that each pattern is unique and recognizable, and each laser emitter than then be assigned a unique identification number. The computing device is configured to detect multiple types of stored pattern in the ID table.

In another embodiment, the laser emitter can instead separate one laser shot consist of one continuous beam into a pattern of short burst. This change increases the number of valid patterns for identification.

In another embodiment, the power output of the laser emitter may be configured in order to vary laser object size, without any hardware change or lens switching. A brighter beam results in a larger laser object, which can be identified in substep 2e. This can combine with the aforemention pattern or double layers pattern to better identify the shots.

In another embodiment, laser emitters can keep beaming steadily over time, thus while the program is still running the detected shot becomes an endless laser beam. The battery in the laser will be drained much faster, so this embodiment is often used when the laser emitter is wired to an external power source. In this case, the laser emitter operates in a reversed manner: the laser emitter stops beaming for a predefined period whenever it receives high magnitude shock signals. This stopping period can also be separated into a pattern. The simulated shot identification process operates almost exactly the same, except that the stopping periods now replace the laser shots. The position of a shot is determined by the position of the laser object in the last frame right before the stopping period starts.

Substep 2i:

The position of the first laser shot in a simulated shot is then registered as the actual position of the simulated shot. This position, initially in camera coordinates, is transformed into the corresponding position on the original image by the mapping mentioned in substep 1d. The final 2-dimensional transformed position is sent to the main simulation application to simulate a virtual shot in a 3-dimensional environment.

The whole process in step 2 operates continuously until the main simulation application, the laser detection program, or the camera is stopped.

What is claimed is:

1. A method to detect, identify and determine the position of laser points shot onto a screen from reconfigurable laser emitters in a system that consists of a camera, a projector and a computing device connected to the camera and the projector, wherein the method is performed by the computing device, comprising the step of:

performing a screen mapping step including:

powering on the system;

controlling the camera to operate with a visible light filter by the computing device;

generating a plurality of calibration images and projecting the calibration images onto the screen by the computing device;

capturing the projected calibration images by the camera;

programmatically processing the captured images to determine boundaries of the projected images including corners, edges, and a bounded area by the computing device;

generating a mapping points within the bounded area of the projected image in the captured image to corresponding points in the calibration images;

and storing the mapping and boundary parameters;

performing a laser shot detection step, wherein the laser shot detection step is executable only after successful completion of the screen mapping step, including:

configuring laser emitters to project unique emission patterns based on spatiotemporal patterns characteristic of firearm types and firing modes;

controlling the camera to operate with a visible light filter by the computing device;

programmatically reading an identification table comprising aforementioned unique pattern configurations and identification numbers for a plurality of laser emitters by the computing device;

executing an object detection loop including:

capturing, by the camera, real-time image frames and continuously streaming the frames to the computing device, and programmatically processing, by the computer device, each captured frame to detect clusters of bright pixels corresponding to potential laser objects and filtering out noise artifacts based on object size, while, by the computing device in parallel, executing a laser shot detection sequence including:

programmatically calculating, for each detected laser object, a center point using a center-of-mass pixel intensity equation;

programmatically discarding false laser objects based on shape, size, and position relative to the bounded area determined in the screen mapping step;

programmatically storing potential laser objects in a table indexed by frame, shot sequence;

programmatically detecting laser shots by identifying consecutive series of laser objects in close proximity in the table that correspond to valid shot durations defined in the identification table;

programmatically identifying simulated shots by correlating multiple detected laser shots with aforementioned spatiotemporal patterns characteristic of firearm types and firing modes;

and transforming the position of the first detected laser shot in a simulated shot from camera coordinates into corresponding coordinates on the original image using the mapping generated in the screen mapping step, and transmitting the final transformed position to a simulation application to generate a virtual shot in a three-dimensional environment.

2. The method of claim 1, wherein the calibration images comprise between one and three images of horizontal stripes, vertical stripes, checkerboard patterns, or randomized patterns with corner markers.

3. The method of claim 1, wherein the processing of the captured images includes programmatically adjusting brightness and contrast in response to ambient light conditions, and generating error messages in the events of a predetermined number of failed attempts.

4. The method of claim 1, wherein at least a portion of the laser shot detection sequence, in particular the calculation of the center point of laser objects and/or the discarding of false laser objects, is performed by the camera instead of the computing device when the camera possesses image processing capabilities.

5. The method of claim 1, wherein the laser emitter is configured to modulate continuous beams into short bursts to form secondary identifiable patterns within said spatiotemporal patterns.

6. The method of claim 1, wherein the laser emitter varies output power to adjust laser object size for pattern recognition.

* * * * *